(12) United States Patent
Kanter et al.

(10) Patent No.: US 10,609,085 B1
(45) Date of Patent: *Mar. 31, 2020

(54) PRIVACY MODEL FOR SHARED COLLECTIONS OF CONTENT ON A SOCIAL NETWORKING SYSTEM

(71) Applicant: Facebook, Inc., Menlo Park, CA (US)

(72) Inventors: Jeffrey Andrew Kanter, San Francisco, CA (US); Robert Michael Baldwin, San Francisco, CA (US); Paul Francois Carduner, Seattle, WA (US); Sai Wo Li, London (GB); Paul Tarjan, Belmont, CA (US); Fred Zhao, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,764

(22) Filed: Apr. 9, 2019

Related U.S. Application Data

(63) Continuation of application No. 15/369,640, filed on Dec. 5, 2016, now Pat. No. 10,298,618, which is a continuation of application No. 13/935,349, filed on Jul. 3, 2013, now Pat. No. 9,514,331.

(51) Int. Cl.
*H04L 29/06* (2006.01)
*G06F 21/62* (2013.01)
*H04L 29/08* (2006.01)

(52) U.S. Cl.
CPC .......... *H04L 63/20* (2013.01); *G06F 21/6245* (2013.01); *H04L 63/10* (2013.01); *H04L 67/10* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| | | | |
|---|---|---|---|
| 9,070,141 | B2 | 6/2015 | Hua et al. |
| 9,317,812 | B2 | 4/2016 | Kabiljo et al. |
| 2006/0184997 | A1 | 8/2006 | La Rotonda et al. |
| 2010/0174993 | A1* | 7/2010 | Pennington ........... G06F 1/1616 715/738 |

(Continued)

OTHER PUBLICATIONS

Hua, M., et al., "Updating Features Based on User Actions in Online Systems," U.S. Appl. No. 13/690,254, filed Nov. 30, 2012.

(Continued)

*Primary Examiner* — Sharif E Ullah
(74) *Attorney, Agent, or Firm* — Fenwick & West LLP

(57) ABSTRACT

A social networking system user creates an album including a shared collection of content (a "shared album") and associates a privacy model with the shared album. The privacy model specifies additional users of the social networking system authorized to access content items in the shared album and specifies types of actions users authorized to access content items in the shared album are permitted to perform to content items in the shared album. Notifications describing actions associated with content items in a shared album may be presented to users authorized to access the shared album. The social networking system may prompt a user to create a shared album containing based on actions performed by the user or performed by connected to the user.

20 Claims, 4 Drawing Sheets

(56) References Cited

U.S. PATENT DOCUMENTS

| | | | |
|---|---|---|---|
| 2011/0202430 A1* | 8/2011 | Narayanan | G06Q 10/10 |
| | | | 705/27.1 |
| 2012/0136936 A1* | 5/2012 | Quintuna | G06F 21/604 |
| | | | 709/204 |
| 2012/0166532 A1 | 6/2012 | Juan et al. | |
| 2013/0145028 A1* | 6/2013 | Shalabi | H04L 63/101 |
| | | | 709/225 |
| 2014/0006947 A1 | 1/2014 | Garmark et al. | |
| 2014/0156360 A1 | 6/2014 | Shalita et al. | |
| 2014/0181935 A1 | 6/2014 | Beckmann et al. | |

OTHER PUBLICATIONS

Kabiljo, I., et al., "Customized Predictors for User Actions in an Online System," U.S. Appl. No. 13/689,969, filed Nov. 30, 2012.
Shalita, A. M., et al., "Dynamic Expressions for Representing Features in an Online System," U.S. Appl. No. 13/690,088, filed Nov. 30, 2012.
United States Office Action, U.S. Appl. No. 13/935,349, dated Oct. 19, 2015, 13 pages.
United States Office Action, U.S. Appl. No. 13/935,349, dated May 21, 2015, 12 pages.
United States Office Action, U.S. Appl. No. 13/935,349, dated Sep. 25, 2014, nine pages.
United States Office Action, U.S. Appl. No. 15/369,640, dated Sep. 6, 2018, 13 pages.
United States Office Action, U.S. Appl. No. 15/369,640, dated Jun. 1, 2018, 18 pages.
United States Office Action, U.S. Appl. No. 15/369,640, dated Jul. 26, 2017, 26 pages.

* cited by examiner

PRIVACY MODEL FOR SHARED COLLECTIONS OF CONTENT ON A SOCIAL NETWORKING SYSTEM

CROSS-REFERENCE TO RELATED APPLICATIONS

This application is a continuation of U.S. patent application Ser. No. 15/369,640, filed Dec. 5, 2016, which is a continuation of U.S. patent application Ser. No. 13/935,349, filed Jul. 3, 2013, now U.S. Pat. No. 9,514,331, which are incorporated by reference in their entirety.

BACKGROUND

This invention relates generally to social networking systems, and in particular to managing access to collections of content shared by social networking system users.

A social networking system allows a user to connect to and communicate with other social networking system users. A user creates a profile on the social networking system that is tied to its identities and includes information about the user, such as interests and demographic information. The increasing popularity of social networking systems and significant amount of user-specific information maintained by social networking systems make a social networking system ideal forum for users to share their interests and experiences with each other by uploading content for sharing with other social networking system users.

Conventional, social networking systems allow users to upload groups of content, such as collections of photographs, to be maintained on the social networking system and shared with other social networking system users. However, based on user-specific settings, such as privacy settings, different users may have different levels of access to content in group of content shared among social networking system users. Conventional social networking systems have limitations on privacy setting configuration that may prevent a user from sharing a complete photo albums with other users. For example, conventional social networking systems may prevent a user from sharing a photo album with users who are indirectly connected to the user; users directly connected to a user sharing a photo album using a conventional social networking system may have access to a greater number of photographs in the photo album than users having an indirect connection to the user sharing the photo album. Additionally, conventional social networking systems do not allow a user sharing a group of content to authorize other users to add additional content to the group of content or to manage user interaction with the group of content. For example, a conventional social networking system prevents a user sharing a photo album from authorizing other users to add photos to the photo album or to share the photo album with additional users.

SUMMARY

A social networking system allows its users to upload content items (e.g., photos, audio data, video data) and organize the content items into albums maintained by the social networking system. For example, social networking system users upload photographs to the social networking system and organize the photographs into one or more albums. A user may create a "shared album" that is accessible to additional social networking system users. A user that creates a shared album on the social networking system is the "owner" of the shared album and may invite additional users to access the shared album or identify additional users authorized to access the shared album. Additional users who accept an invitation to access a shared album or who are identified as authorized to access the shared album are "members" of the shared album.

To regulate access to content items in a shared album, one or more privacy settings are associated with the shared album and specify social networking system users authorized to access content items included in the shared album. For example, a public privacy setting allows all social networking system users to access content items in the shared album, while a private privacy setting limits access to content item in the shared album to members of the shared album. An intermediate setting may allow an owner of the shared album to identify specific users or to identify characteristics of users authorized to access content items in the shared album. For example, using an intermediate setting, a shared album owner may limit access to content items in the shared album to members of the shared album and social networking system users connected to a particular member of the shared album.

Privacy settings associated with a shared album may also regulate actions that members of the shared album may perform on content items within the shared album. An owner of a shared album may add or remove members from the shared album, add content items to the shared album, add or modify tags associated with content in the shared album, change privacy settings or metadata associated with the shared album, and delete the shared album. Additionally, the owner of a shared album may also specify privacy settings for additional members of the shared album that authorize the members to perform different actions. For example, privacy settings associated with a member limit the member's permissible actions to adding additional members, adding additional content items, adding tags to content items in the shared album, and deleting only content items and metadata added to the shared album by only the member.

In one embodiment, then an action associated with a shared album is performed, a notification is provided to social networking system users authorized to access the shared album through any suitable channel. For example, a push notification, a text message, an e-mail, a story, or other suitable communication describing an action associated with the shared album is presented to users authorized to access the shared album. Additionally, the social networking system may prompt a user to create a shared album based on actions identified by the social networking system. For example, a user is prompted to create a shared album if a threshold number of users connected to each other check-in at a location, attend an event, or request access to an album. Further, shared albums may be created from existing albums or merged with existing albums on the social networking system.

DETAILED DESCRIPTION

Overview

Figure 1:
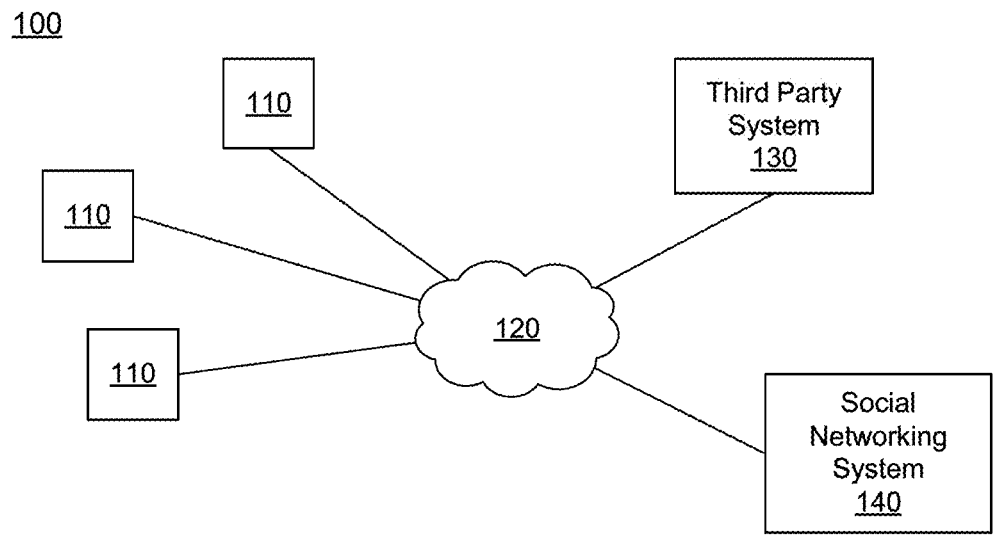
FIG. 1 is a block diagram of a system environment in which a social networking system operates, in accordance with an embodiment of the invention.

A social networking system allows its users to upload and organize content items, (e.g., photographs, audio data, video data, etc.) into albums and to grant additional social networking system users permission to access content items in the groups (i.e., shared albums). A user that creates a shared album on the social networking system is the "owner" of the shared album. The owner of a shared album may invite additional social networking system users to access content items in the shared album or to identify additional users authorized to access to the shared album. Additional users accepting an invitation to access a shared album or identified as authorized to access the shared album are referred to as "members" of the shared album.

Social networking system users authorized to access content items in a shared album may be specified by one or more privacy settings associated with the shared album. Privacy settings associated with a shared album may be generally categorized as "private," "public," and "intermediate." A private privacy setting limits access to content items in the shared album to only members of the shared album, while a public privacy setting allows all social networking system users access to content items in the shared album. An intermediate privacy setting allows an owner of a shared album to specify additional users authorized to access content items in the shared album. For example, using an intermediate privacy setting, an owner identifies characteristics of users authorized to access content items in a shared album. As a specific example, a shared album owner limits access to the shared album to members of the shared album and users connected to members of the shared album through an intermediate privacy setting.

A shared album owner may add and remove members or content item to and from the shared album, add or modify tags associated with content items in the shared album, change privacy settings and metadata associated with the shared album, and delete the shared album. However, actions by members of a shared album are regulated by privacy settings associated with the shared album by the owner. Privacy settings associated with a shared album may limit actions involving the shared album or content items in the shared album that a member of the shared album is authorized to perform. For example, members of a shared album may be limited to performing actions identified by a privacy setting. Additionally, notifications describing an action associated with a shared album may be presented via any suitable communication channel to social networking system users authorized to access the shared album.

In one embodiment, the social networking system a user to create a shared album based on actions performed by the user or by additional social networking system users. For example, a user is prompted to create a shared album if a threshold number of users connected to each other on the social networking system check-in at a location, attend an event, or request access to an existing album. In addition to creating new shared albums, social networking system users may create a shared album from an existing album or merge a shared album with an existing album to create an additional shared album.

System Architecture

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
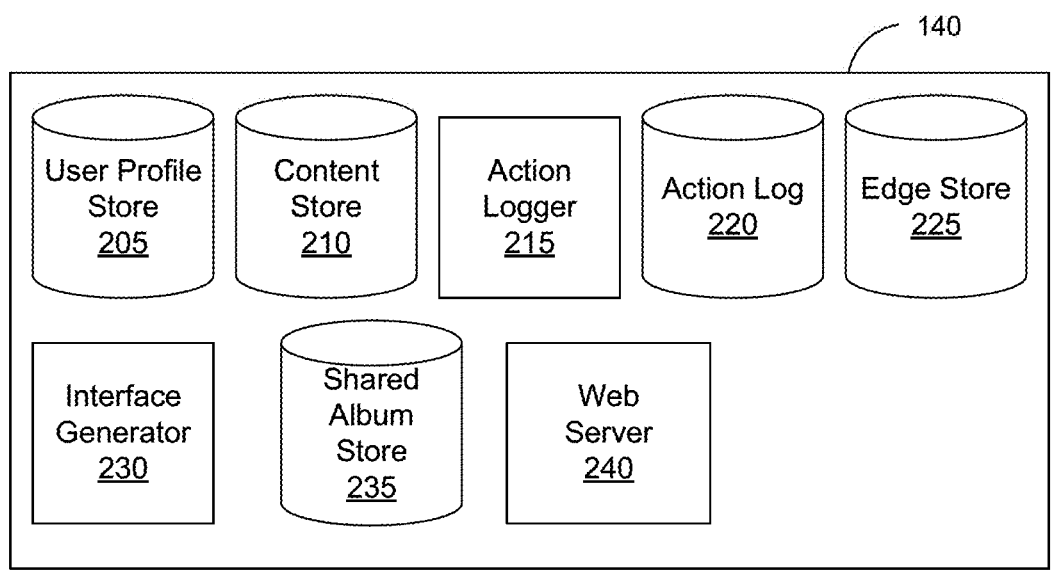
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, an interface generator 230, a shared album store 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 generates one or more interfaces, such as web pages, including content from the online system 140. For example, interfaces generated by the interface generator 230 include images, video, profile information, or other data. The interface generator 230 also generates one or more interfaces allowing the online system 140 to request information from users and for users to provide information to the online system 140 via the client device 110 and the network 120. For example, the interface generator 230 generates a form for a user to provide biographic information, such as the user's age, for inclusion in the user's user profile. When other users request a user's profile page, the interface generator 230 retrieves data from the profile store 205 and generates a representation of the information in the user profile for presentation by the client device 110.

In one embodiment, the interface generator 230 generates a prompt including a suggestion to create a shared album for presentation to a user based on actions performed by the user or by other social networking system users connected to the user. For example, the interface generator 230 generates a prompt to create a shared album when a threshold number of users connected to each other through the social networking system 140 check-in at a location, attend an event, request access to an album, or perform another suitable action; the prompt is presented to one or more of the users that performed the action through any suitable communication channel (e.g., push notification, text message, recommendation unit, etc.). The interface generator 230 also generates a shared album user interface allowing a user to create, access and manage content in a shared album. Privacy settings associated with a shared album are retrieved and used to modify the content of the shared album user interface presented to a user. For example, the actions associated with a shared album presented to various users by the shared album user interface vary depending on the privacy settings associated with the shared album and with different users. Examples of actions associated with a shared album presented to a user through the shared album user interface include: inviting additional users to access the shared album, identifying additional users authorized to access the shared album, removing members from the shared album, adding content items to the shared album, removing content items from the shared album, associating metadata with content items in the shared album, associating metadata with the shared album, modifying metadata associated with content items in the shared album or with the shared album, deleting the shared album, removing the user from accessing the shared album, and merging the shared album with another album.

The interface generator 230 may generate stories or other notifications describing actions associated with a shared album or with content items in a shared album (e.g., adding photos, commenting on the shared album, etc.). Notifications describing actions associated with a shared album may be presented to members of the shared album through any suitable communication channel. For example, notifications are presented as stores in a timeline or newsfeed shown to users authorized to access the shared album or are described by e-mails, text messages, or other types of communication sent to users authorized to access the shared album. The interface generator 230 is further described below in conjunction with FIGS. 3-4D.

The shared album store 235 includes one or more privacy settings associated with various shared album and information identifying content items included in various shared albums. For example, the shared album store 235 includes a shared album identifier and content item identifiers associated with the shared album identifier that identify content items stored in the content store 210. A privacy model associated with a shared album identifies one or more privacy settings associated with the shared album by an owner of the shared album. Privacy settings associated with a shared album identify users authorized to access the shared album as well as actions associated with the shared album that various users authorized to access the shared album are authorized to perform.

In some embodiments, the shared album store 235 also includes information describing the owner of a shared album, members of the shared album, and users invited to access the shared album. For example, identifiers of user profiles associated with a shared album's owner and the shared album's members, as well as users invited to access the shared album, are associated with the shared album's identifier. In one embodiment, Information describing users authorized to access or invited to access a shared album is retrieved from the shared album store 235 to identify users who are permitted to access a shared album and actions that various users accessing the shared album are capable of performing. For example, a privacy setting associated with a shared album includes a description of one or more action types associated with an identifier of a user profile to indicate the types of actions associated with the shared album that a user corresponding to the identified user profile is authorized to perform. User identification information included in a privacy setting may also be used to identify users to receive notifications of actions associated with a shared album. Metadata or other information associated with a shared album may also be stored in the shared album store 235. For example, a comment about an individual photo in a shared album is stored in the content store 210, while a comment about the shared album itself is stored in the shared album store 235.

The web server 240 links the social networking system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or RIM®.

Creation of a Shared Album

Figure 3:
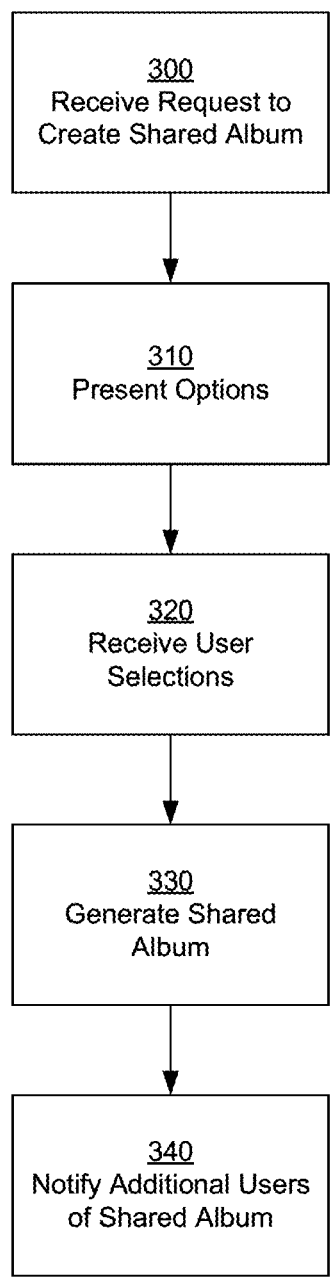
FIG. 3 is a flow chart of a method for creating a shared album, in accordance with an embodiment of the invention.
Figure 4A:
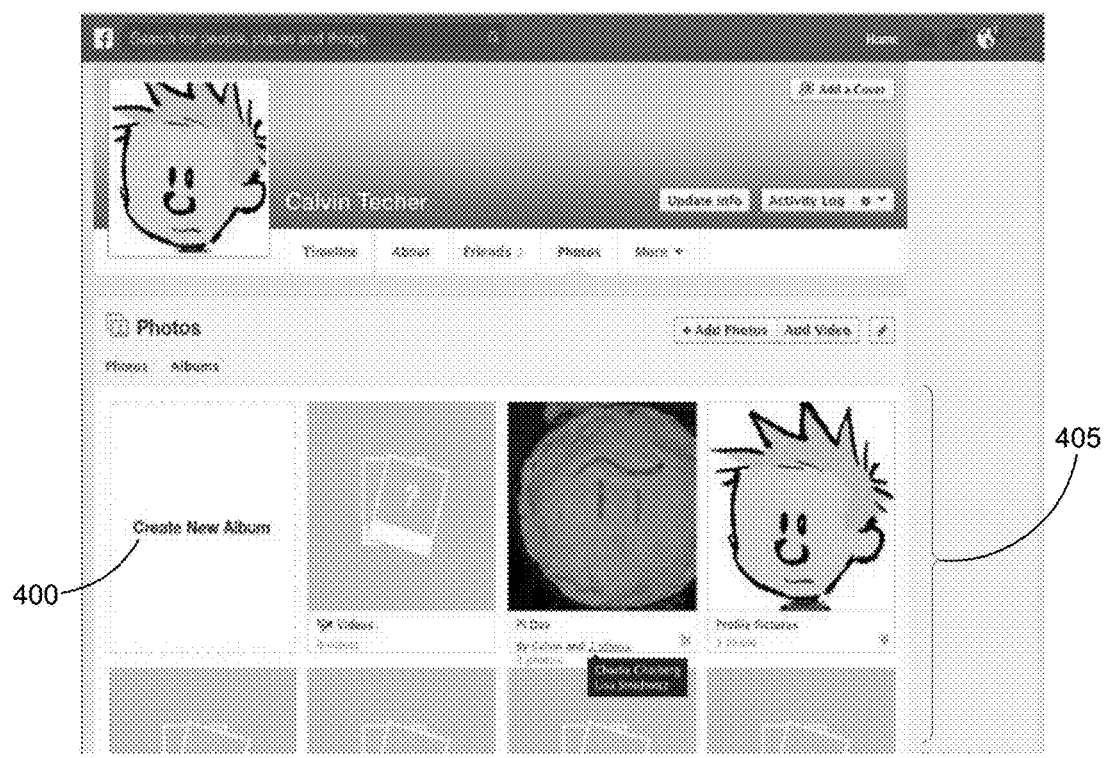
FIGS. 4A-4D are examples of a shared album user interface, in accordance with an embodiment of the invention.
Figure 4B:
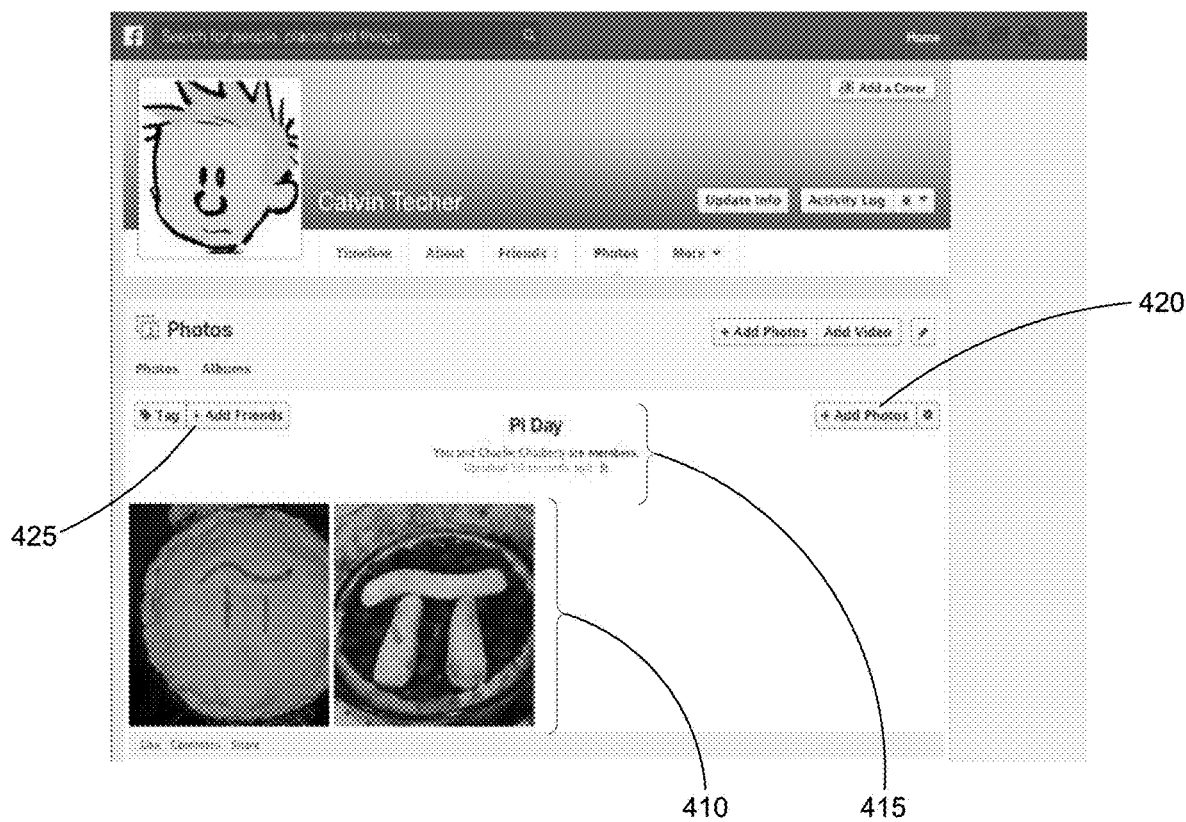

FIG. 3 is a flow chart of one embodiment of a method for creating a shared album. The social networking system 140 receives 300 a request to create a shared album from a user. In one embodiment, the request is received 300 via a shared album user interface; FIGS. 4A-4B illustrated examples of a shared album user interface. As shown in the example of FIG. 4A, the shared album user interface identifies various shared albums 405 associated with a user as well as an interface element for creating a new shared album 400. When the user accesses the interface element for creating a new shared album 400, a request to create a shared album is communicated to the social networking system 140.

The social networking system 140 may also prompt a user to create a shared album based on actions associated with the user or actions associated with other social networking system users connected to the user. In one embodiment, the interface generator 230 provides a notification to a user prompting the user to create a shared album if the user performs one or more actions. For example, a user is prompted to create a shared album if a user checks-in at a location where other users connected to the user have also checked-in, if a threshold number of users connected to each other are associated with a content item or with content items having one or more common characteristics (e.g., connected users are tagged in photos taken at the same location and time), if a user requests access to an album that is not a shared album, or if the user uploads a content item associated with an event. In one embodiment, if a user uploads a content item associated with entity having a user profile maintained by the social networking system 140, an administrator or the event is notified of the upload and may sponsor presentation a prompt to the uploading user to add the content to a shared album owned by the entity. For example, if a user uploads a photo taken at a Giants baseball game, an administrator of the user profile for the Giants may compensate the social networking system 140 to prompt the user to add the photo to a shared album owned by the Giants.

In addition to receiving 300 a request to create a shared album, the social networking system 140 may receive 300 a request from an album owner to make an existing album a shared album, a request to merge an existing album with an existing shared album, or a request from an owner of a shared album to merge an existing shared album with another existing shared album. If a request to make an existing album a shared album is received 300, metadata stored by the social networking system 140 and associated with the existing album or with content items within the album are preserved. For example, if a user requests to convert the user's photo album into a shared album, feedback and comments associated with individual photos in the photo album are preserved and remain associated with the photographs in the shared album, and feedback and comments associated with the photo album in its entirety remain associated with the shared album. If a request to merge an existing unshared album with an existing shared album is received 300, the metadata associated with the existing unshared album may be deleted, while metadata associated with content items in the existing album is preserved. For example, if the social networking system 140 receives 300 a request to merge an unshared album with a shared album, comments associated with the unshared album are deleted while comments associated with individual content items in the unshared album and comments associated with the shared album and its content items are preserved in the merged album. Privacy settings of the shared album created by merging an unshared album with a shared album are specified as the privacy settings of the original shared album.

If the social networking system 140 receives 300 a request to merge existing shared albums into a single shared album, the privacy settings of the merged shared album may remain the same if the original shared albums have the same privacy settings. In one embodiment, confirmation of the privacy settings for the merged shared album is requested from owners of each shared album to be merged (e.g., confirmation may be requested from an owner of one of the shared albums to be merged, confirmation may be requested from the owners of each of the shared albums to be merged, etc.); the privacy settings are associated with the merged shared album when confirmation is received. However, if the privacy settings of the shared albums to be merged differ, privacy settings associated with one of the shared albums may be initially specified as the privacy settings associated with the merged shared album. In one embodiment, confirmation of the privacy settings for the merged shared album is requested from owners associated with one or more of the shared albums to be merged (e.g., confirmation may be requested from an owner of one of the shared albums to be merged, confirmation may be requested from the owners of each of the shared albums to be merged, etc.); when confirmation of the privacy settings is received, the privacy settings are applied to the merged shared album. The metadata associated one or more of the original shared albums may be deleted, while metadata associated with content items included in the shared albums is preserved; alternatively, metadata associated with each of the shared albums may be preserved and included in the merged shared album along with metadata associated with content items included in the original shared albums.

When the social networking system 140 receives 300 the request to create a shared album from a user, options associated with the shared album are presented 310 and information identifying the user as the owner of the shared album is stored. For example, an identifier associated with the shared album is included in the shared album store 235 and an identifier of the user profile associated with the user is associated with the shared album identifier along with an indication the user is the owner of the corresponding shared album. Examples of options presented 310 are shown in the user interface of FIG. 4B and include an interface for creating the content of the shared album, options for specifying the layout of the shared album, an interface for identifying members of the shared album or for identifying users to invite to access the shared album, and an interface for specifying privacy settings determining access to content in the shared album by members as well as determining types of actions users authorized to access the shared album are authorized to perform.

Referring to the example user interface of FIG. 4B, an owner of a shared album may specify a title 415 for the shared album and access an interface element 420 to add, to remove, or to modify content items included in the shared album or metadata associated with content items included in the shared album. Additionally, the interface for creating the shared album content shown in FIG. 4B presents content items included in the shared album 410. Any suitable type of content item may be included in a shared album. Examples of types of content items included in a shared album include image data, audio data, video data, and other types of media data. An owner of a shared album may organize the content items included in the shared album 410 based on any suitable criteria. For example, if photos are included in a shared album, an owner of the shared album may organize the photos in the shared album based on the titles of the photos, the time the photos were taken, the users who provided the photos to the social networking system 140, the location in which the photos were taken, or the number of likes or comments associated with the photos. The interface for creating the shared album content shown in FIG. 4B also includes a membership interface element 425 allowing an owner of a shared album to add or remove members associated with the shared album or to invite additional social networking system users to become members of the shared album. The owner may also specify additional owners of the shared album or invite additional social networking system users to become owners of the shared album via the membership interface element 425.

In one embodiment, privacy settings for accessing content items in a shared album are classified as "public," "private," or "intermediate." A private privacy setting limits access to content items in the shared album to only members of the shared album. Social networking system users become members of a shared album by being identified by the owner of the shared album or by accepting an invitation sent by the social networking system 140 on behalf of the shared album owner to become a member of the shared album. A public privacy setting allows all social networking system users access to content items in the shared album. An intermediate privacy setting allows members and specified users of the social networking system 140 (e.g., users connected to members of the shared album) to view the content 410 of the shared album. For example, using an intermediate privacy setting, an owner identifies characteristics of users authorized to access content items in a shared album. Examples of characteristics of users authorized to access a shared album include a connection to a user identified by a privacy setting as authorized to access the shared album, a connection to an owner of the shared album, a type of connection to a user identified by the privacy setting authorized to access the shared album, and a type of connection to the owner of the shared album. As a specific example, a shared album owner limits access to the shared album to members of the shared album and users connected to members of the shared album through an intermediate privacy setting. For private and intermediate privacy settings, a social networking system user associated with content items included in a shared album (e.g., users tagged in photos included in a shared album) who is not a member of the shared album may be permitted to access content items associated with the user or associated with another user connected to the user, but not permitted to access other content items included in the shared album.

Figure 4C:

A shared album owner may specify privacy settings authorizing different members of the shared album to perform different actions associated with the shared album. For example, privacy settings specified for a particular member allow that member to add tags to photos that the member did not provide to the shared album, while privacy settings associated with other members limit those members to adding tags to photos those members provided to the shared album. Examples of types actions associated with a shared album authorized by one or more privacy settings include: allowing members to add other members, allowing members to add content items, allowing members to associated tag with content items, allowing members to specify metadata (e.g., indications of preferences for a content item, comments, etc.) associated with content items, allowing members to delete content items they provided to the shared album, and allowing members to delete or modify metadata associated with content items they provided to the shared album. FIGS. 4B and 4C show examples of interface elements presented to various members depending on their associated privacy settings depending on the privacy settings associated with a member. In the example user interfaces of FIGS. 4B-4D, a content item addition interface element 420, a member addition interface element 425, a tag addition interface element 430, a metadata addition interface element 435, and an interface element 445 for requesting withdrawal of a user's authorization to access a shared album are shown. However, in other embodiments, other suitable interface elements may be presented to a member by a user interface depending on the privacy settings associated with the member.

The social networking system 140 receives 320 selections of options from the owner associated with shared album, and generates 330 the shared album based on the received selections. Content items identified by the users, as well as privacy settings, ownership information, and membership information received 320 from the owner associated with shared album are used to generate 330 the shared album. When the shared album is generated 330, it is accessible to the owner and to the additional users of the social networking system 140 authorized to access the shared album. In various embodiments, users authorized to access the shared album are notified 340 when the shared album is generated 330. For example, a story describing generation of the shared album is presented in a newsfeed or timeline presented to users authorized to access the shared album. The example user interface of FIG. 4C shows an example of a notification 440 presented 340 presented to users authorized to access the shared album. Users authorized to access the shared album may be notified 340 of generation of shared album through any suitable communication channel (e.g., push notification, text message, e-mail, etc.).

Figure 4D:
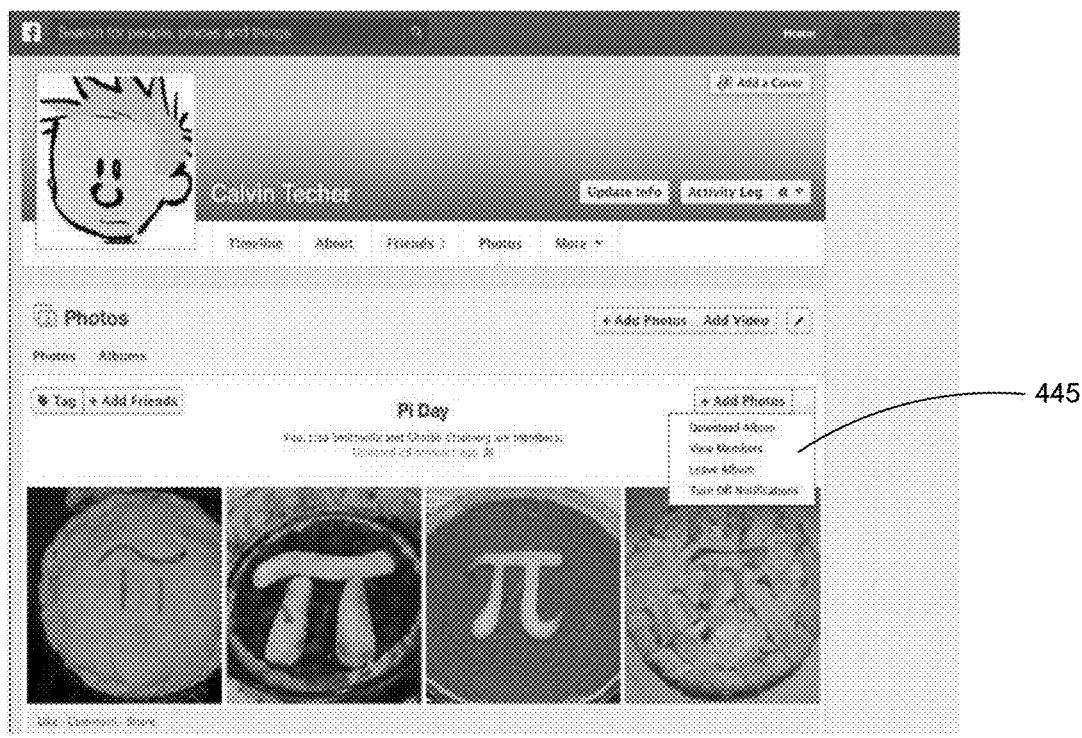

As described above, owners and members of a shared album perform a variety of actions associated with the shared album via the shared album user interface, as illustrated in the examples of FIGS. 4B-4D. When a user accesses the shared album, privacy settings associated with the shared album are retrieved from the shared album store 235 to determine whether the user is authorized to access content items included in the shared album and to identify types of actions associated that the user is authorized to perform, and interface elements for performing suitable actions are presented to the user. As described above, an owner of a shared album may authorize additional users to access a shared album, add or remove content items from the shared album, add or modify tags associated with content items from the shared album, add additional owners to the shared album, withdrawal other users' authorization to access the shared album, rescind invitations for other users to access the shared album, delete content items included in the shared album, or delete the shared album. Depending on the privacy settings associated with a member of the shared album, the member may authorize other users to access the shared album, add content items to a shared album, add or modify tags associated with content items in the shared album, or delete content items or metadata provided to the shared album by the member. Members may elect to have their authorization to access the shared album removed by (e.g., by selecting an interface element 445 for requesting withdrawal of a user's authorization to access a shared album as shown in FIG. 4D). However, a member may not delete a shared album unless all other members, including the owner (or owners) have rescinded authorization to access the shared album.

An owner or members of a shared album may perform various actions associated with the shared album, such as downloading the shared album or individual content items from the shared albums, viewing additional members of the shared album, and electing not to receive notifications associated with the shared album sent by the social networking system 140. In one embodiment, notifications describing actions performed by users of the social networking system 140 and associated with the shared album or with content items included in a shared album (e.g., inviting/adding other members, expressing a preference for a content item in a shared album, providing comments, adding content items to the shared album, etc.). The notifications of actions associated with the shared album may be presented to social networking system users authorized to access the shared album using any suitable communication channel (e.g., via a news feed, via a timeline, via a text message, via an e-mail, via presentation in an activity log, etc.).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   in a social networking system, determining that a threshold number of users connected to each other as a group of users have checked into a common location using the social networking system;
   responsive to determining that the threshold numbers of users in the group have checked into the common location, generating a prompt to a target user in the group to create a shared collection of media content accessible to the group of users;
   providing the prompt to the target user via the social networking system;
   responsive to the prompt, receiving one or more media items from the target user for adding to the shared collection;
   responsive to receiving the request, presenting the target user with a set of options associated with the shared collection;
   receiving from the target user, a privacy setting for the shared collection controlling accessibility to the shared collection by other users in the social networking system; and
   setting a privacy configuration associated with the shared collection based on the privacy setting.

2. The method of claim 1, further comprising:
   notifying other users in the group of users authorized to access the shared collection.

3. The method of claim 2, wherein notifying the other users comprises:
   identifying the other users as having a characteristic specified by the privacy setting; and
   providing the shared collection to the other users having the characteristic.

4. The method of claim 3, wherein the characteristic specified by the privacy setting is selected from a group consisting of: a connection to a user identified by a privacy setting, a connection to the user, a type of connection to the user identified by the privacy setting, a type of connection to the user, and any combination thereof.

5. The method of claim 1, further comprising:
   receiving a request from a second user to merge a second album into the shared collection; and
   merging the second album with the shared collection in response to the request.

6. The method of claim 5, wherein merging the second album into the shared collection comprises:
   deleting comments associated with the second album; and
   preserving comments associated with individual content items of the second album.

7. The method of claim 5, wherein merging the second album into the shared collection comprises:
   requesting confirmation of the privacy setting associated with the shared collection from the second user; and
   applying the privacy setting to the second album in response to the confirmation.

8. The method of claim 1, wherein the privacy setting identifies one or more types of actions and identifies a plurality of users authorized to perform the one or more types of actions.

9. A non-transitory computer-readable storage medium storing instructions executable by a processor, the instructions when executed causing the processor to perform steps comprising:
   in a social networking system, determining that a threshold number of users connected to each other as a group of users have checked into a common location using the social networking system;
   responsive to determining that the threshold numbers of users in the group have checked into the common location, generating a prompt to a target user in the group to create a shared collection of media content accessible to the group of users;
   providing the prompt to the target user via the social networking system;
   responsive to the prompt, receiving one or more media items from the target user for adding to the shared collection;
   responsive to receiving the request, presenting the target user with a set of options associated with the shared collection;
   receiving from the target user, a privacy setting for the shared collection controlling accessibility to the shared collection by other users in the social networking system; and
   setting a privacy configuration associated with the shared collection based on the privacy setting.

10. The non-transitory computer-readable storage medium of claim 9, the instructions when executed further causing the processor to perform steps comprising:
    notifying other users in the group of users authorized to access the shared collection.

11. The non-transitory computer-readable storage medium of claim 10, wherein notifying the other users comprises:
    identifying the other users as having a characteristic specified by the privacy setting; and
    providing the shared collection to the other users having the characteristic.

12. The non-transitory computer-readable storage medium of claim 11, wherein the characteristic specified by the privacy setting is selected from a group consisting of: a connection to a user identified by a privacy setting, a connection to the user, a type of connection to the user identified by the privacy setting, a type of connection to the user, and any combination thereof.

13. The non-transitory computer-readable storage medium of claim 9, the instructions when executed further causing the processor to perform steps comprising:
    receiving a request from a second user to merge a second album into the shared collection; and
    merging the second album with the shared collection in response to the request.

14. The non-transitory computer-readable storage medium of claim 13, wherein merging the second album into the shared collection comprises:
    deleting comments associated with the second album; and
    preserving comments associated with individual content items of the second album.

15. The non-transitory computer-readable storage medium of claim 14, wherein merging the second album into the shared collection comprises:
    requesting confirmation of the privacy setting associated with the shared collection from the second user; and
    applying the privacy setting to the second album in response to the confirmation.

16. The non-transitory computer-readable storage medium of claim 9, wherein the privacy setting identifies one or more types of actions and identifies a plurality of users authorized to perform the one or more types of actions.

17. A system comprising:
    a processor; and
    a non-transitory computer-readable storage medium storing instructions executable by a processor, the instructions when executed causing the processor to perform steps comprising:
       in a social networking system, determining that a threshold number of users connected to each other as a group of users have checked into a common location using the social networking system;
       responsive to determining that the threshold numbers of users in the group have checked into the common location, generating a prompt to a target user in the group to create a shared collection of media content accessible to the group of users;
       providing the prompt to the target user via the social networking system;
       responsive to the prompt, receiving one or more media items from the target user for adding to the shared collection;
       responsive to receiving the request, presenting the target user with a set of options associated with the shared collection;
       receiving from the target user, a privacy setting for the shared collection controlling accessibility to the shared collection by other users in the social networking system; and
       setting a privacy configuration associated with the shared collection based on the privacy setting.

18. The system of claim 17, the instructions when executed further causing the processor to perform steps comprising:

notifying other users in the group of users authorized to access the shared collection.

19. The system of claim 17, wherein notifying the other users comprises:
 identifying the other users as having a characteristic specified by the privacy setting; and
 providing the shared collection to the other users having the characteristic.

20. The system of claim 19, wherein the characteristic specified by the privacy setting is selected from a group consisting of: a connection to a user identified by a privacy setting, a connection to the user, a type of connection to the user identified by the privacy setting, a type of connection to the user, and any combination thereof.

* * * * *